United States Patent [19]
Tracy et al.

[11] 3,721,457
[45] March 20, 1973

[54] ROLL AND SWAY CONTROL ASSEMBLY

[76] Inventors: Richard A. Tracy, 2455 4th Street, Sparks, Nev. 89431; Julian C. Garate, 815 N. Maddux Street, Reno, Nev. 89502

[22] Filed: Aug. 18, 1971

[21] Appl. No.: 172,731

[52] U.S. Cl. ............ 280/112 A, 280/124 R, 267/10
[51] Int. Cl. ............................................. B60g 11/36
[58] Field of Search .......... 280/112 A, 124 R; 267/10

[56] References Cited

UNITED STATES PATENTS

| | | | |
|---|---|---|---|
| 3,341,217 | 9/1967 | Eaton | 280/124 R X |
| 2,759,741 | 8/1956 | Newton | 280/112 A |
| 1,748,337 | 2/1930 | Fox | 267/10 |

*Primary Examiner*—Philip Goodman
*Attorney*—Clarence A. O'Brien et al.

[57] ABSTRACT

A compression spring controlled assembly for connection between the body or frame portion of a vehicle and an unsprung wheel of the vehicle relative to which the body or frame portion is vertically shiftable. The assembly is operative to increasingly yieldingly resist downward movement of the vehicle wheel relative to the frame or body portion or upward movement of the body or frame portion relative to the wheel past the relative static positions thereof. The spring controlled assembly includes a connection between the vehicle wheel and associated frame or body portion operative during upward motion of the body or frame portion and downward movement of the wheel relative to the associated frame or body portion past the relative static portions thereof. The spring controlled assembly does not in any way increase the load carrying capacity of the associated vehicle, but does function to decrease the adverse effects of a high center of gravity of laden weight and also functions to minimize the tendency of the frame and body portion of an unladen vehicle to roll while cornering.

9 Claims, 7 Drawing Figures

Richard A. Tracy
Julian C. Garate
INVENTORS

BY Clarence A. O'Brien
and Harvey B. Jacobson
Attorneys

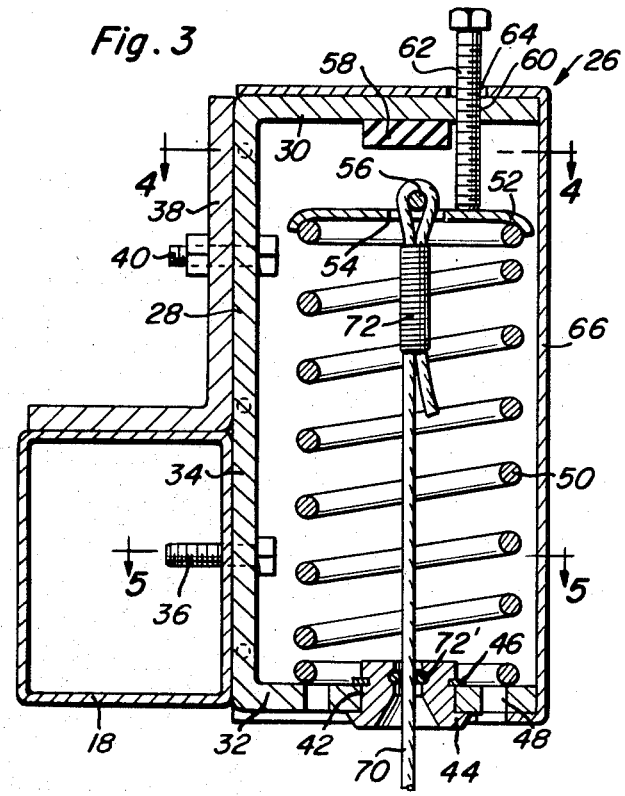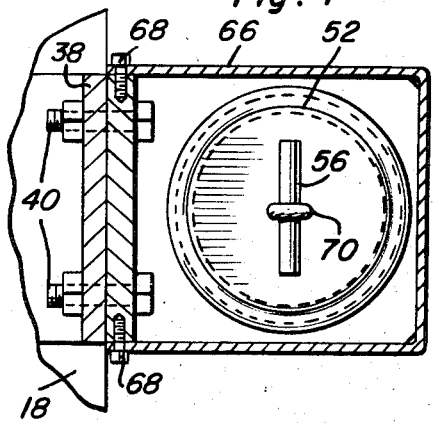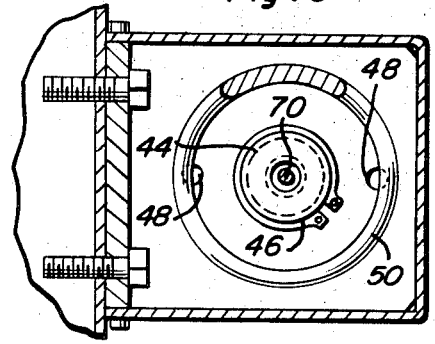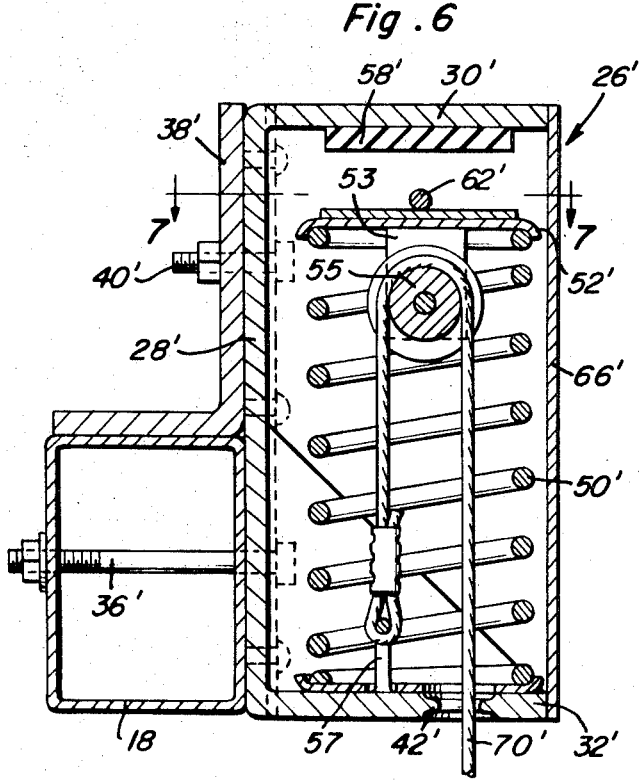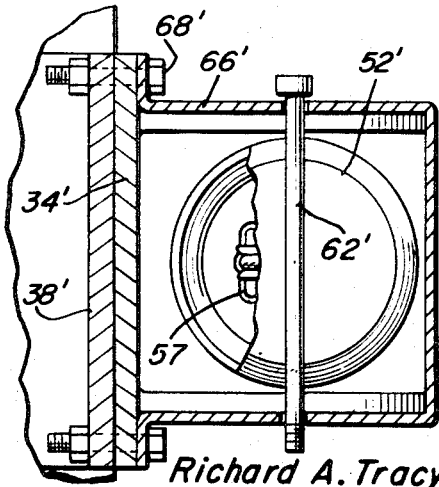

ROLL AND SWAY CONTROL ASSEMBLY

The roll and sway control assembly of the instant invention functions to reduce any tendency of the associated vehicle to sway, roll or yaw. Further, the steering of the associated vehicle is more precise and ride control is greatly increased during movement of the associated vehicle over substantially all types of road surfaces.

Basically, the control assembly of the instant invention functions only to increasingly yieldingly resist upward movement of an associated body or frame portion past a predetermined position relative to the wheel portion of a vehicle from which the body or frame portion is supported, the predetermined position being either above or below the static position of the body or frame portion when the vehicle is at rest and supporting its normal load.

In addition to functioning to reduce sway, roll and yaw, the roll and sway control assembly further functions to increase braking control. The roll and sway control assembly is primarily designed for application at the rear of an associated vehicle and, as hereinbefore set forth, resists movement of the rear body and frame portions upwardly away from the corresponding rear wheel assembly above the normal static position of the rear body and frame portions. Therefore, when sudden braking is effected, there is less tendency for excess weight transfer of the body and frame portions of the vehicle to the front wheel suspension components and therefore the braking action of the front and rear wheels of the vehicle is more evenly balanced.

In addition to increasing the ride control of an associated vehicle in the above-mentioned manners, the roll and sway control assembly further functions to reduce wear of the suspension components of the associated vehicle. The compression springs of the roll and sway control assembly assist the conventional shock absorbers of the associated vehicle in controlling rebound movements of the associated body and frame portions and thus the over-all movement of an associated vehicle is reduced thereby in effect increasing the life of the suspension components of the associated vehicle.

The main object of this invention is to provide a control assembly for vertically shiftable body and frame portions of vehicles operative to function in a manner resisting upward movement of the associated body and frame portions past their normal static positions.

Another object of this invention, in accordance with the immediately preceding object, is to provide a roll, sway, and yaw control assembly whose components may be readily mounted on substantially all types of conventional vehicle suspension systems.

A still further object of this invention is to provide a control assembly whose mounting components may be readily modified in order to adapt the control assembly for utilization in connection with substantially any wheeled vehicle.

Another object of this invention is to provide a control assembly which may be operatively associated with the suspension components of a vehicle without a large increase in weight to the unsprung components of the suspension system of the vehicle.

A final object of this invention to be specifically enumerated herein is to provide a control assembly which will conform to conventional forms of manufacture, be of simple construction and easy to install so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged fragmentary transverse vertical sectional view taken substantially upon the plane passing through the center of the upstanding housing portion of the roll and sway control assembly;

FIG. 4 is a fragmentary horizontal sectional view taken substantially upon the plane indicated by the section line 4—4 of FIG. 3;

FIG. 5 is a horizontal sectional view taken substantially upon the plane indicated by the section line 5—5 of FIG. 3;

FIG. 6 is a fragmentary transverse vertical sectional view similar to FIG. 3 but of a modified form of roll and sway control assembly; and FIG. 7 is a fragmentary horizontal sectional view taken substantially upon the plane indicated by the section line 7—7 of FIG. 6.

Figure 1:
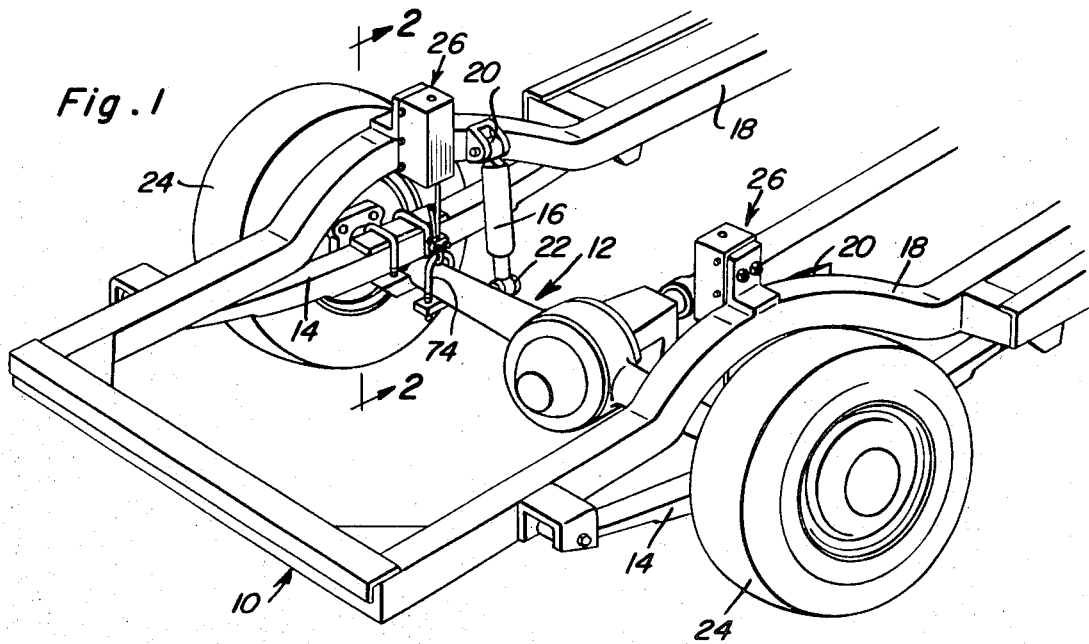
FIG. 1 is a fragmentary perspective view of the rear portion of a conventional form of motor vehicle with which the roll and sway control assembly of the instant invention is operatively associated.

Referring now more specifically to the drawings, the numeral 10 generally designates the main frame of a conventional motor vehicle from whose rear portion a rear axle assembly referred to in general by the reference numeral 12 is supported by means of a pair of opposite side leaf spring assemblies 14.

A pair of opposite side shock absorbers 16 have their upper ends secured to the longitudinal frame rails 18 of the frame 10 as at 20 and their lower ends secured to the opposite end portions of the axle assembly 12 as at 22.

As is conventional, the shock absorbers tend to snub vertical movement of the rear axle assembly 12 relative to the frame 10 and therefore excess vertical shifting of the axle assembly 12 relative to the frame 10 during movement of the vehicle over rough road surfaces is minimized to increase traction of the wheels 24 supported at the opposite ends of the axle assembly 12.

The roll and sway control assembly of the instant invention consists of a pair of roll and sway control components referred to in general by the reference numerals 26. The components 26 are supported from the opposite side longitudinal members 18 of the frame 12 and include connections with the associated end portions of the rear axle assembly 12 in a manner to be hereinafter more fully set forth.

With reference now more specifically to FIGS. 3 through 5 of the drawings, the components 26 each includes a horizontally inwardly opening and longitudinally extending channel member 28 consisting of upper and lower horizontal flanges 30 and 32 interconnected at corresponding side marginal edge portions by means of a vertical flange 34. The vertical flanges 34 are secured to the longitudinal frame members 18 by means of fasteners 36 and also to rigid angle brackets 38 by means of fasteners 40, the angle bracket 38 being rigidly secured in any convenient manner to the longitudinal frame members 18.

The lower flanges 32 have central openings 42 formed therein nd guide sleeves or center guides 44 are secured through the openings 42 by means of removable snap rings 46. In addition, the lower flanges 32 also have air circulation openings 48 formed therein.

A heavy duty compression spring 50 is interposed between each pair of upper and lower flanges 30 and 32 with the lower end of each spring 50 resting upon the upper surface of the lower flange 32 generally centered relative to the corresponding opening 42. An apertured downwardly opening end cap 52 overlies and snugly embraces the upper end of each spring 50 and has a central opening 54 formed therethrough over which a diametric anchoring bar 56 is secured. In addition, the upper flange 30 is provided with an underside resilient bumper block 58 and the upper flange 30 has a slightly off-center threaded bore 60 formed therethrough, the shank portion of an abutment bolt 62 being downwardly threaded through the bore 60 and passing through an aperture 64 formed in a sheet metal cover 66 secured to the flange 34 by means of suitable fasteners 68 and enclosing the upper and lower flanges 30 and 32 as well as the compression spring 50 and cover 52.

An upper end portion of an upstanding flexible cable 70 is passed upwardly through the opening 54, looped over the rod or bar 56 and thereafter passed downwardly through the opening 54 and secured as at 72. The lower end portion of the cable 70 extends downwardly through the guide sleeve or center guide 44 which is provided with a ball bearing guide 72' and the lower end of the cable 70 is anchored to a U-bolt clamp 74 secured about the corresponding end of the rear axle assembly 12. Accordingly, it may be seen that excessive downward movement of the corresponding end of the rear axle 12 will result in the cable 70 being tensioned and the compression spring 50 being compressed to limit further downward movement of the axle assembly 12.

In installation, the bolt 62 is initially threaded downwardly through the bore 60 so as to urge the cover or cap 52 downwardly and preload the spring 50. Thereafter, the component 26 is secured to the longitudinal member 18 and the anchor bracket 38 and the cable 70 may be anchored to the axle assembly 12 by means of the U-bolt clamp 74. Thereafter, the preload bolt 62 may be backed out of the bore 60 so that the bar 56 may engage the abutment block 58.

Then, as the axle assembly 12 moves up and down relative to the main frame 10, at any time the distance between the abutment block 58 and the axle assembly 12 exceeds the effective length of the cable 70, the cable 70 will be tensioned to further compress the spring 50 and thus resist further downward movement of the corresponding end of the axle assembly 12 relative to the longitudinal frame member 18.

With attention now invited more specifically to FIGS. 6 and 7 of the drawings, there will be seen a modified form of the invention which is substantially identical to the component 26 and which therefore has the elements thereof corresponding to the similar elements of the component 26 designated by corresponding prime refrence numerals. The component 26' differs from the component 26 in that the opening 42' thereof is not centered relative to the spring 50' and is not provided with a guide sleeve or center guide such as the center guide 44, although such a guide sleeve or center guide could be provided if desired. Further, instead of the upper end of the cable 70' being anchored to the cover 52', the latter is imperforate and supports a depending pulley assembly 53 including a pulley wheel 55 over which the upper end portion of the cable 70' is trained. The free end of the cable 70' is, however, secured to a U-bolt anchor 57 secured to the lower flange 32' of the channel member 28'. Thus, the component 26' compresses the spring 50' by approximately one-half the rate at which the spring 50 is compressed in response to a given amount of relative movement between the associated axle and frame.

Further, the component 26' includes a transverse preload bolt 62' secured through opposite sides of the cover 66' which is utilized to maintain the spring 50' compressed during attachment of the lower end of the cable 70' to the corresponding axle end. Still further, the cover 66' is secured to the vertical flange 34' by means of fasteners 68' which generally parallel the fasteners 36' and 40', the fastener 36' being secured entirely through not only the vertical flange 34 but the entire corresponding longitudinal frame member 18.

Figure 2:
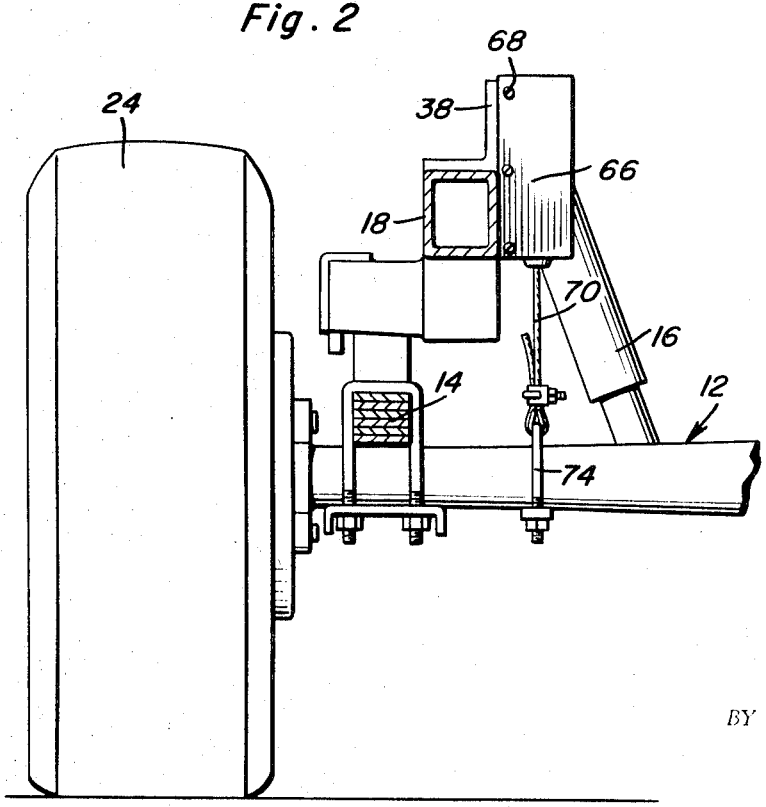
FIG. 2 is a fragmentary enlarged transverse vertical sectional view taken substantially upon the plane indicated by the section line 2—2 of FIG. 1.

Of course, the operation of that form of the invention illustrated in FIGS. 6 and 7 is substantially identical to the operation of the form illustrated in FIGS. 1 through 5, with the exception that the spring 50' is compressed at only one-half the rate the spring 50 is compressed in response to the same amount of movement of the associated axle member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle of the type including a wheel support structure from which a frame structure of said vehicle is supported for guided generally vertical shifting relative thereto between upper and lower limit positions, means yieldingly biasing said frame structure upwardly relative to said wheel support structure for support of the former from the latter and establishing an intermediate static position of said frame structure below and above said upper and lower limit positions, respectively, assumed by said frame structure upon its normal loading on said wheel support structure, a roll and sway control assembly including means operatively connected between said support structure and said frame yieldingly resisting upward movement of said frame structure and thus opposing said biasing means above a rebound position thereof above said lower limit, said means yieldingly resisting upward movement of said frame structure including elongated spring means having one end anchored relative to said frame and the other end anchored, by means of a lost-motion connection, to said wheel support structure for movement along a path generally paralleling the path of movement of said wheel support structure relative to said frame structure.

2. The combination of claim 1 wherein said spring means comprises an elongated coil spring extending along said path.

3. The combination of claim 2 wherein one end of said spring is disposed adjacent said support member, said lost motion connection comprising an elongated flexible tension member having one end portion attached to the other end of said spring remote from said wheel support structure, said elongated tension member extending longitudinally through at least the end portion of said coil spring adjacent said axle and having the free end portion thereof attached to said wheel support structure.

4. The combination of claim 3 including means operative to releasably retain said compression spring in a partially compressed condition with said other end portion thereof shifted toward said one end thereof.

5. The combination of claim 4 wherein the last-mentioned means includes means operative to retain said spring means in adjusted partially compressed positions.

6. The combination of claim 4 wherein said last-mentioned means includes means operative to releasably retain said spring means in a predetermined partially compressed condition.

7. The combination of claim 1 wherein said assembly includes a removable housing portion fully enclosing said spring means.

8. The combination of claim 1 wherein said spring means comprises an elongated coil spring extending along said path, one end of said spring being disposed adjacent said wheel support structure, said lost motion connection comprising an elongated flexible tension member having one end portion attached to the other end of said spring remote from said wheel support structure, said elongated tension member extending longitudinally through at least the end portion of said coil spring adjacent said axle and having the free end portion thereof attached to said wheel support structure, an end cap disposed over said other end of said compression spring, said one end portion of said tension member being anchored relative to said end cap.

9. The combination of claim 1 wherein said spring means comprises an elongated coil spring extending along said path, one end of said spring being disposed adjacent said wheel support structure, said lost motion connection comprising an elongated flexible tension member having one end portion attached to the other end of said spring remote from said wheel support structure, said elongated tension member extending longitudinally through at least the end portion of said coil spring adjacent said axle and having the free end portion thereof attached to said wheel support structure, said other end of said spring having an end cap disposed thereover, a pulley wheel journaled from said end cap, disposed within said coil spring and supported for rotation about an axis disposed transverse to the longitudinal axis of said coil spring, said one end portion of said tension member being passed over said pulley wheel and anchored relative to said frame structure adjacent said one end of said compression spring.

* * * * *